J. F. FOX.
AXLE TRUCK.
APPLICATION FILED APR. 18, 1919.
1,355,760.   Patented Oct. 12, 1920.
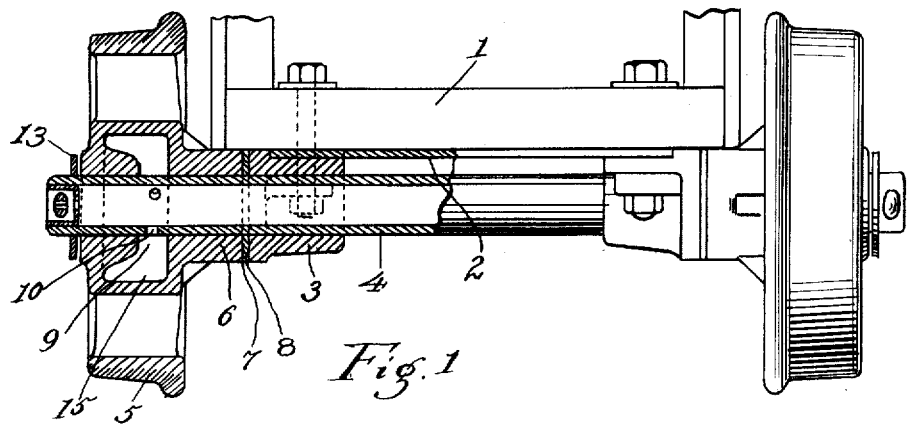
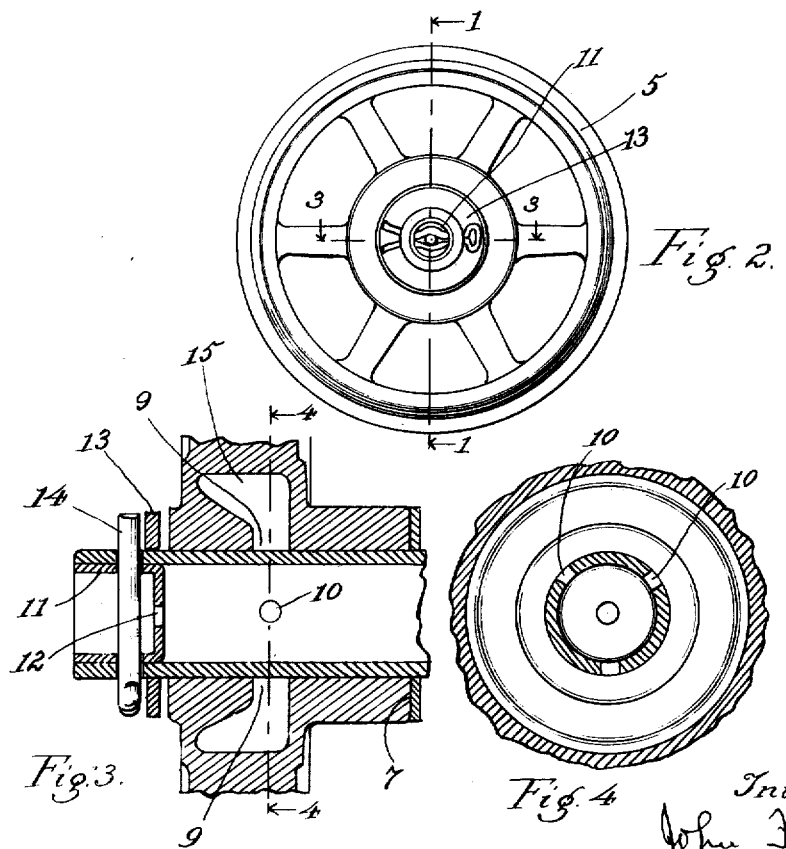
Inventor:
John F. Fox
By Allen + Allen
Attorneys.

UNITED STATES PATENT OFFICE.

JOHN F. FOX, OF BIRMINGHAM, ALABAMA, ASSIGNOR TO SOUTHERN WHEEL COMPANY, OF ST. LOUIS, MISSOURI, A CORPORATION OF GEORGIA.

AXLE-TRUCK.

1,355,760.  Specification of Letters Patent.  Patented Oct. 12, 1920.

Application filed April 18, 1919. Serial No. 291,053.

*To all whom it may concern:*

Be it known that I, JOHN F. FOX, a citizen of the United States, and a resident of Birmingham, in the county of Jefferson and State of Alabama, have invented certain new and useful Improvements in Axle-Trucks, of which the following is a full, clear, and exact description, reference being had to the accompanying drawing, forming part of this specification.

It is the object of my invention to provide a simple, strong and effective construction for axle trucks where the thrust of the wheel hubs against the axle boxes is taken care of in an improved manner.

This object and other advantages which will be noted, I accomplish by that certain construction and arrangement of parts to be hereinafter more specifically pointed out and claimed.

In the drawing,

Figure 1 is a view of the new device, partly in front elevation and partly in vertical section.

Fig. 2 is an end elevation of one of the axles and wheel of the hollow axle type, showing the method of securing the axle closing plug in place.

Fig. 3 is an enlarged section on the line 3—3 of Fig. 2.

Fig. 4 is an enlarged detail section on the line 4—4 of Fig. 3.

The truck 1, having a steel bottom plate 2, and axle boxes 3, supports in said axle boxes the hollow axle 4, preferably a cold drawn seamless tube. The wheels 5 having the hubs 6 are mounted over the axle and have the inner faces of these hubs chilled as indicated at 7, Figs. 1 and 3. Mounted on the axle intermediate the axle boxes and the chill faces 7 of the wheel hubs are hard steel washers 8. These washers together with the chilled inner faces of the hubs form a thrust bearing for the hubs which is practically indestructible. The thrust from the wheels is inwardly toward the axle boxes and the contact of chilled iron to hard steel provided, fully takes care of this thrust. The wheel hubs have grooves 9 cored in their inner faces and the hollow axle is provided with series of interspaced ports 10 which are of less width than the grooves and form a passage whereby grease from the axle can get into the wheel hub grooves.

Having thus described my invention, what I claim as new and desire to secure by Letters Patent is:—

In a wheel and axle assembly, the combination with an axle box, of an axle, a wheel having a hub mounted on said axle, with the horizontal inner face of the said wheel hub chilled to render it hard, said wheel hub lying adjacent to the axle box, and a hard steel washer lying over the axle and free between the axle box and the chilled face of the wheel hub, whereby the thrust and wear of the wheel hub with relation to the axle box is provided for by one chilled and hard element integral with the wheel hub, and another chilled and hard element free to rotate with relation to the wheel hub and the axle box.

JOHN F. FOX.